United States Patent
DeRoche

[19]
[11] Patent Number: 6,050,752
[45] Date of Patent: Apr. 18, 2000

[54] CUTTING INSERT

[75] Inventor: Kenneth G. DeRoche, Greensburg, Pa.

[73] Assignee: Kennametal Inc., Latrobe, Pa.

[21] Appl. No.: 09/273,133

[22] Filed: Mar. 19, 1999

[51] Int. Cl.[7] .............................. B23B 27/16; B23C 5/20
[52] U.S. Cl. ...................... 407/114; 407/115; 407/116; 407/35
[58] Field of Search .................... 407/114, 115, 407/113, 116, 35, 34, 40, 43, 47, 48, 50, 53, 60, 62

[56] References Cited

U.S. PATENT DOCUMENTS

| | | | |
|---|---|---|---|
| 3,800,379 | 4/1974 | Hopkir | 407/114 X |
| 4,072,438 | 2/1978 | Powers | 407/115 X |
| 4,215,957 | 8/1980 | Holma et al. | 407/114 |
| 4,318,644 | 3/1982 | Seidel | 407/114 |
| 4,359,300 | 11/1982 | Hazra et al. | 407/114 |
| 4,479,744 | 10/1984 | Stricker | 407/114 |
| 4,859,122 | 8/1989 | Patterson et al. | 407/114 |
| 5,044,840 | 9/1991 | Fouquer et al. | 407/114 |
| 5,074,720 | 12/1991 | Loqvist et al. | 407/114 |
| 5,232,319 | 8/1993 | Satran et al. | 407/113 X |
| 5,388,932 | 2/1995 | DeRoche et al. | 407/113 |
| 5,456,557 | 10/1995 | Bernadic et al. | 407/114 |
| 5,688,081 | 11/1997 | Paya | 407/115 |
| 5,695,303 | 12/1997 | Boianjiu et al. | 407/114 |
| 5,772,365 | 6/1998 | Vogel et al. | 407/42 |
| 5,797,707 | 8/1998 | Stallwitz et al. | 407/113 X |
| 5,810,520 | 9/1998 | Hintze et al. | 407/114 |

*Primary Examiner*—Henry W. H. Tsai
*Attorney, Agent, or Firm*—Larry R. Meenan

[57] ABSTRACT

The present invention relates to a cutting insert for enhanced chip control. The insert includes a rake surface extending partially along a side cutting edge of the insert to a transition location and extending inwardly toward the center of the insert. A deflecting surface extends upwardly and inwardly toward the center of the insert from the rake surface and beyond the transition location extends upwardly and inwardly from the side cutting edge.

21 Claims, 6 Drawing Sheets

CUTTING INSERT

BACKGROUND OF THE INVENTION

1. Field of the Invention

The present invention relates to cutting tools used in metalworking operations and in particular, to an indexable cutting insert having a geometry which promotes chip control during metalworking operations.

2. Description of the Prior Art

During a metalworking operation, material is removed by a cutting tool from a workpiece. To maximize efficiency and minimize the potential for damage caused by this material, cutting tools are designed to remove this material and thereafter to reduce this material into short segments known as chips. Designers of such cutting tools are constantly looking for designs which will promote and control the formation of chips which generally is referred to as chip control. As a result, the many types of machining operations have precipitated an equal number of chip control designs. However, as machining operations become more and more demanding, designers are continuously seeking improved chip control features which will make metalworking operations more efficient.

U.S. Pat. No. 5,695,303 disclosed a cutting insert having a plurality of undulating grooves extending inwardly toward the center of the insert along a cutting edge. The grooves in this design are perpendicular to the cutting edge. However, the unrestrained path of a chip upon a cutting insert is in a direction that is not perpendicular to the cutting edge and, as a result, the direction of the grooves in this patent may not work in concert with the flow of chips.

It is therefore an object of this invention to provide a cutting insert which promotes the formation of chips by incorporating a chip control pattern more closely simulating the natural path a chip flows after it is removed from a workpiece.

BRIEF SUMMARY OF THE INVENTION

The invention is directed to an indexable cutting insert comprising a polygonal body of wear-resistant material. The body has a center and includes top and bottom surfaces and therebetween a peripheral wall with sides and corners. The intersection of the peripheral wall and the top surface forms a cutting edge, wherein for a cutting operation, the insert is intended to engage a workpiece using the cutting edge along a first corner and a side adjacent to that first corner and extending to a second corner. The top surface comprises a rake surface extending inwardly from the side cutting edge toward the center of the insert along a length of the side cutting edge from the first corner to a transition location spaced from the second corner.

The top surface further comprises a deflecting surface extending upwardly and extending inwardly toward the center of the insert body along the length of the cutting edge, wherein between the first corner and the transition location the deflecting surface is recessed from the side cutting edge and adjacent to the rake surface and wherein between the transition location and the second corner the deflecting surface is directly adjacent to the side cutting edge. Furthermore, the insert rake surface may have a plurality of rake corrugations extending inwardly from the cutting edge. The deflecting surface may also have a plurality of deflecting corrugations extending from the rake corrugations.

BRIEF DESCRIPTION OF THE DRAWINGS

The exact nature of the present invention will become more clearly apparent upon reference the following detailed specification taken in connection with the accompanying drawings in which.

DETAILED DESCRIPTION OF THE INVENTION

Figure 1:
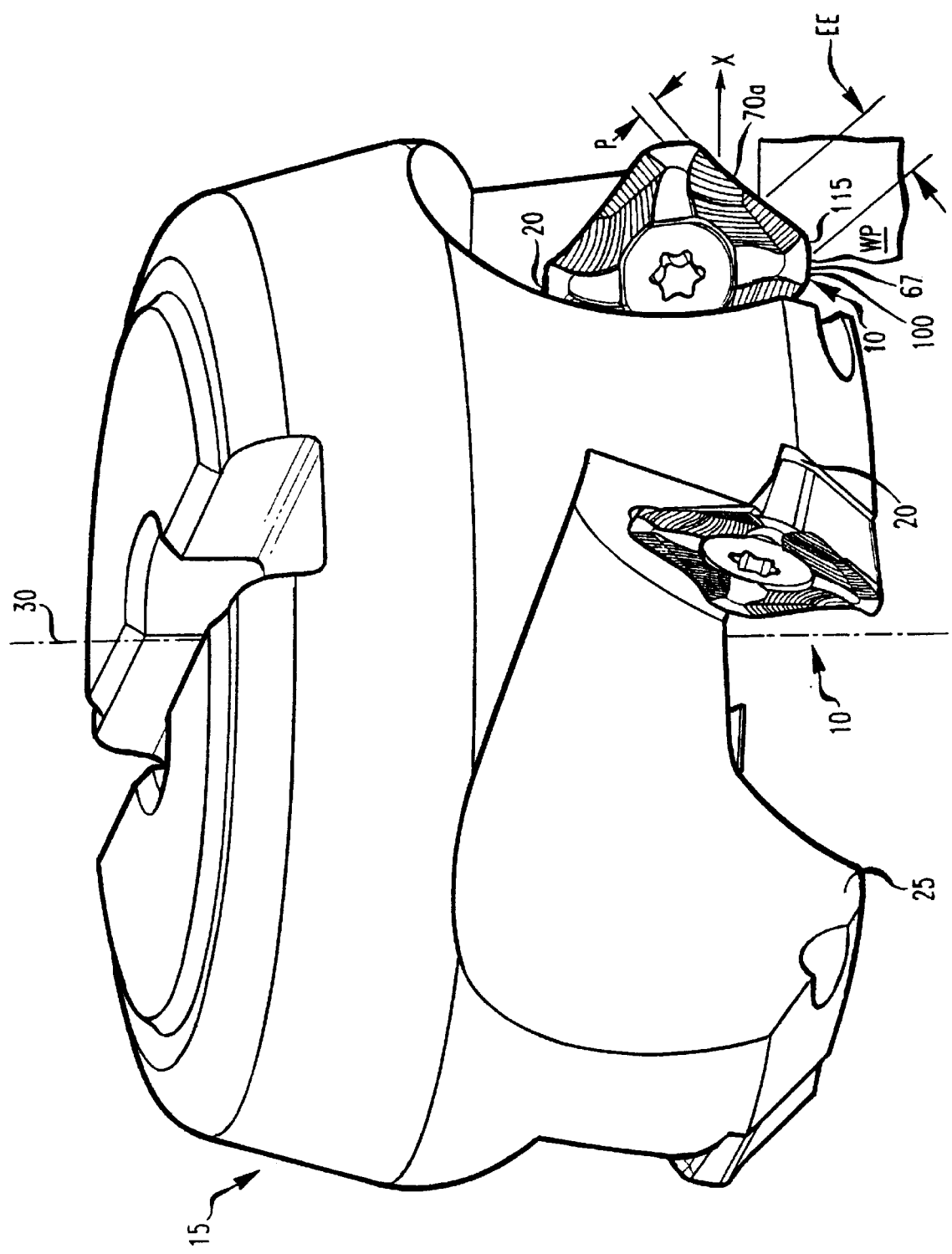
FIG. 1 is an isometric view of a cutting insert in accordance with the subject invention mounted within a cutter body.

The cutting insert of the present invention is shown in FIG. 1 and indicated generally by reference number 10. In one application for the cutting insert 10, the insert may be mounted within a rotating milling cutter body 15. It should be understood that utilizing the cutting insert 10 in such a body 15 should not be limiting and the subject insert may also be used in other cutting bodies such as those utilized in turning or drilling operations.

However, as shown in FIG. 1, the milling cutter body 15 includes a plurality of circumferential spaced insert pockets 20 formed around the cutting end 25 of the milling cutter body 15. The milling cutter body 15 is designed to be rotatably driven about a central longitudinal axis 30. As the milling cutter body is rotated, the cutting insert 10 acts to engage a workpiece.

Figure 2:
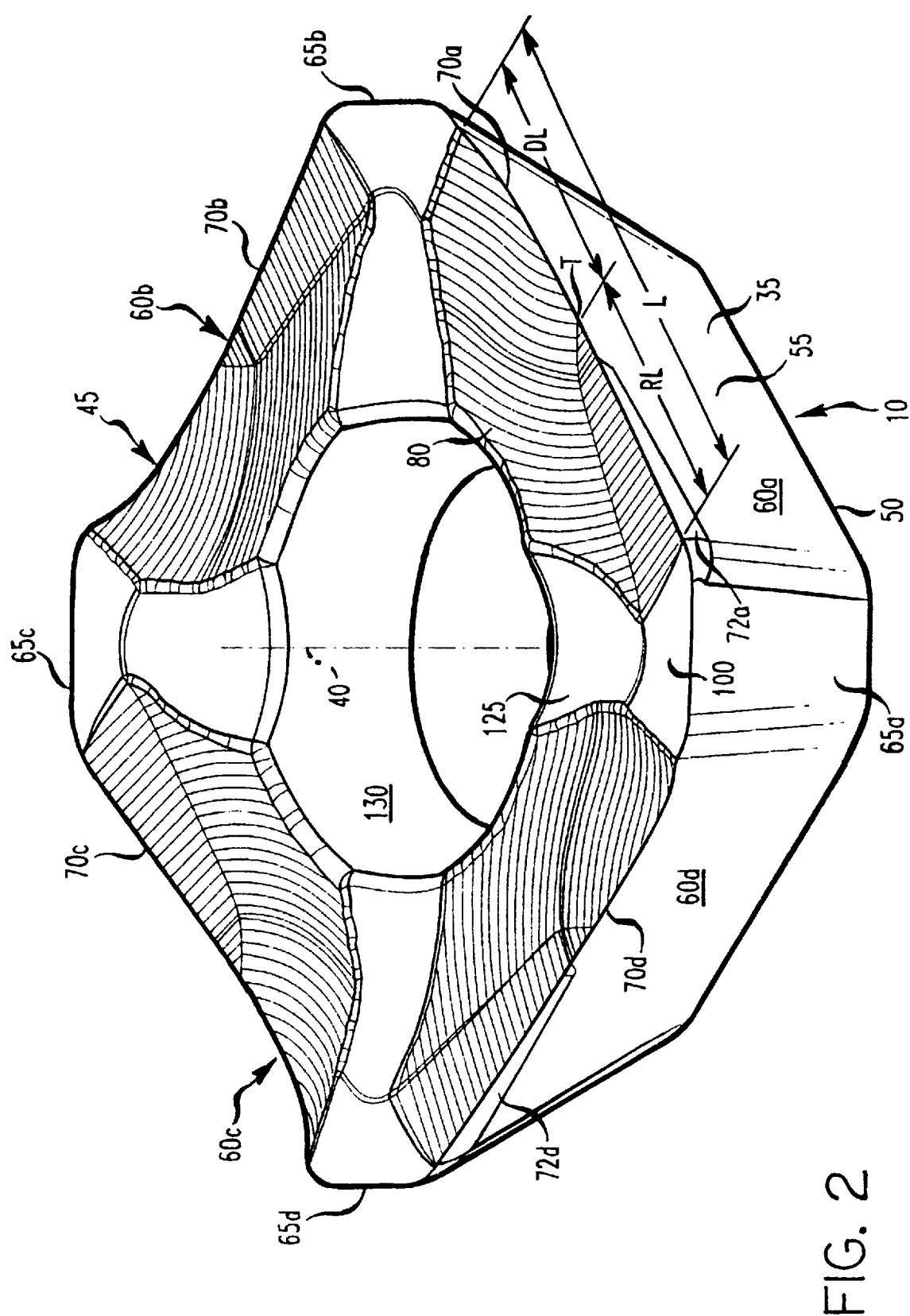
FIG. 2 is an isometric view of the cutting insert in accordance with the subject invention.

FIG. 2 illustrates an isometric view of cutting insert 10 removed from the milling cutter body 15. The insert 10 has a polygonal body 35 of wear-resistant material. The body is symmetric about a center line 40 and includes a top surface 45 and a bottom surface 50 with a peripheral wall 55 therebetween. The peripheral wall 55 has sides 60a, b, c, d and corners 65a, b, c, d. For reference throughout this application, a reference plane P will be defined as a plane resting upon the uppermost points of the four corners 65a, b, c, d. This plane P is illustrated in FIGS. 4 and 5 and it should be noted that the top surfaces of the four corners 65a, b, c, d are not necessarily parallel to the plane P.

The intersection of the peripheral wall 55 and the top surface 45 forms a cutting edge 70, which for convenience, will be referred to as cutting edges 70a, b, c, d associated with sides 60a, b, c, d respectively. The sides 60a, b, c, d and the corners 65a, b, c, d are tapered to provide clearance from the workpiece during the metalworking operation. As seen in FIG. 4, the side 60a, which is typical of each side, is tapered to form an angle A with a line perpendicular to the plane P. This angle A is referred to as the flank clearance angle and may have a value of between 0° and 30° and as shown has an angle of approximately 20°.

Figure 5:
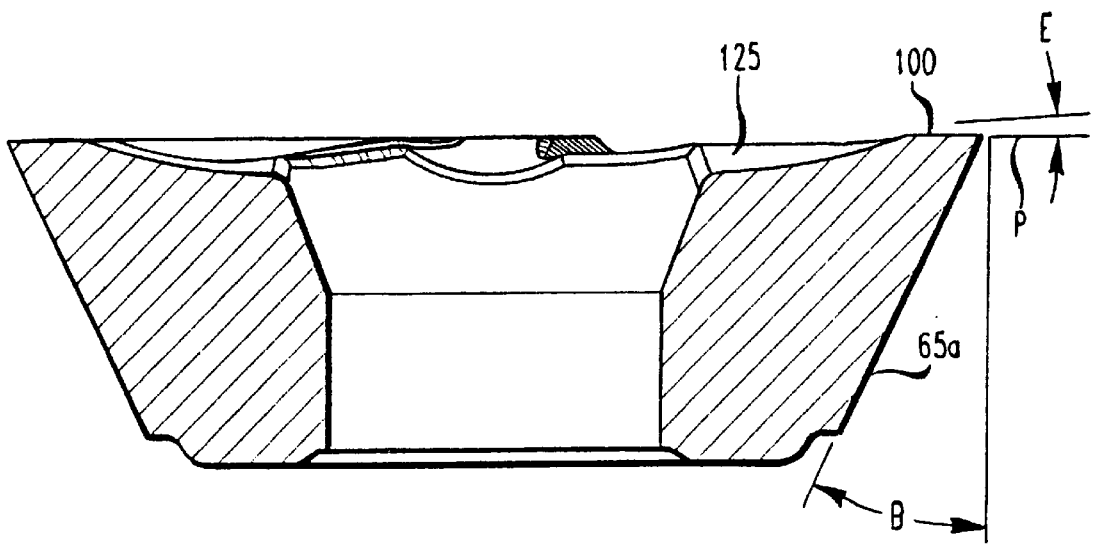
FIG. 5 is a section view of the cutting insert along arrows "5—5" in FIG. 3.

Additionally, as shown in FIG. 5, the corner 65a, which is typical of each corner, is tapered to form an angle B with a line perpendicular to the plane P. This angle B is referred to as the facet clearance angle and may have a value of between 0° and 30° and as shown has an angle of approximately 25°.

Figure 4:
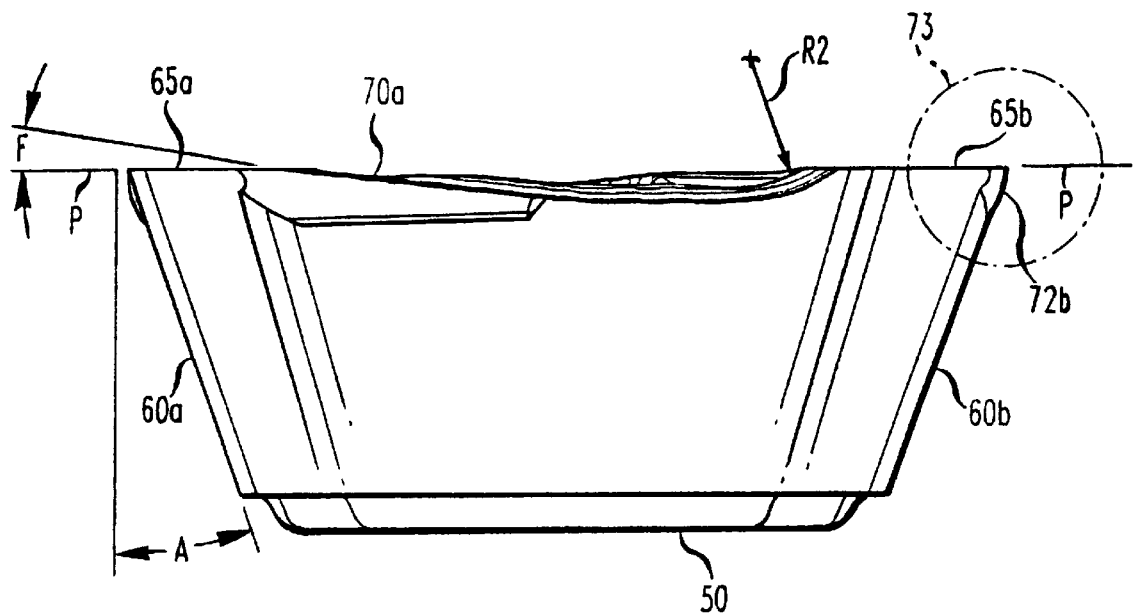
FIG. 4 is a side view of the cutting insert illustrated in FIG. 2.
Figure 7:
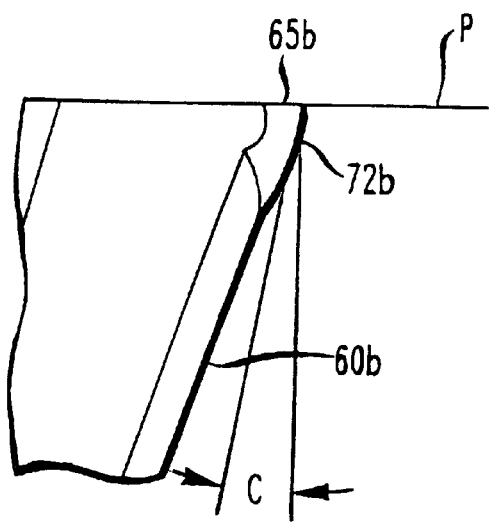
FIG. 7 is an enlarged view of the encircled portion in FIG. 4.

In FIGS. 2 and 4, as illustrated with respect to side cutting edge 70a, a concave relief surface 72a may protrude from the side 60a beneath the side cutting edge 70a to provide additional strength to the side cutting edge 70a. The relief surface 72a may also extend onto the corner 65a. Specifically, the encircled area 73 in FIG. 4 is enlarged in FIG. 7. Although relief surface 72b is highlighted, each other relief surface may have similar features. Relief surface 72b may be concave and curved such that at the intersection of the relief surface 72b and the cutting edge 70b, a tangential line along the relief surface 72b forms a relief surface clearance angle C with a line perpendicular to the plane P of between 0°–15°. Furthermore, as illustrated in FIG. 2, using side 60a, the relief surface 72a may extend along the side 60a and into the corner 65a at an angle comparable to that of the angle associated with side 60b.

For the purposes of this discussion, a cutting insert having an insert geometry identified as a square will be presented. However, it should be realized that the configuration of this invention should not be limited to a square and that other geometric shapes may be substituted. Among the shapes may be other rhombic configurations such as an 80° diamond (which has two 80° corners and two 100° corners), a 55° diamond (which has two 55° corners and two 125° corners), a triangle or a trigon.

During a cutting operation, the insert 10 engages a workpiece (not shown), using for example, the cutting edge 70a extending from the first corner 65a along a side 60a adjacent to the first corner 65a to a second corner 65b.

Although it is possible for the top surface 45 proximate to only one side 60a to contain the features hereinafter discussed, the insert 10 illustrated in FIG. 2 is symmetric about center line 40 and the topographical features are symmetric on each of the four sides of 60a, b, c, d about the center line 40. With an understanding that the discussion directed to side 60a may be applied equally to any of the other sides or in the alternative may be applied to an insert having a different configuration, side 60a along with associated corners 65a and 65b will be discussed.

The top surface 45 associated with sides 60a is comprised of a rake surface 75, which may be planar, extending inwardly from side cutting edge 70a toward the center of the insert 10 along a length RL of the side cutting edge 70a from the first corner 65a to a transition location T from the second corner 65b. The rake surface 75 may also extend downwardly as it extends inwardly from the side cutting edge 70a. Separate from the rake surface 75, a deflecting surface 80 extends upwardly and inwardly toward the center of the insert body 35 along the length L of the side cutting edge 60a.

Between the first corner 65a and the transition location T, the deflecting surface 80 is recessed from the side cutting edge 70a and is adjacent to the rake surface 75. Between the transition location T and the second corner 65b, the deflecting surface 80 is adjacent to the cutting edge 70a along a length DL.

Figure 3:
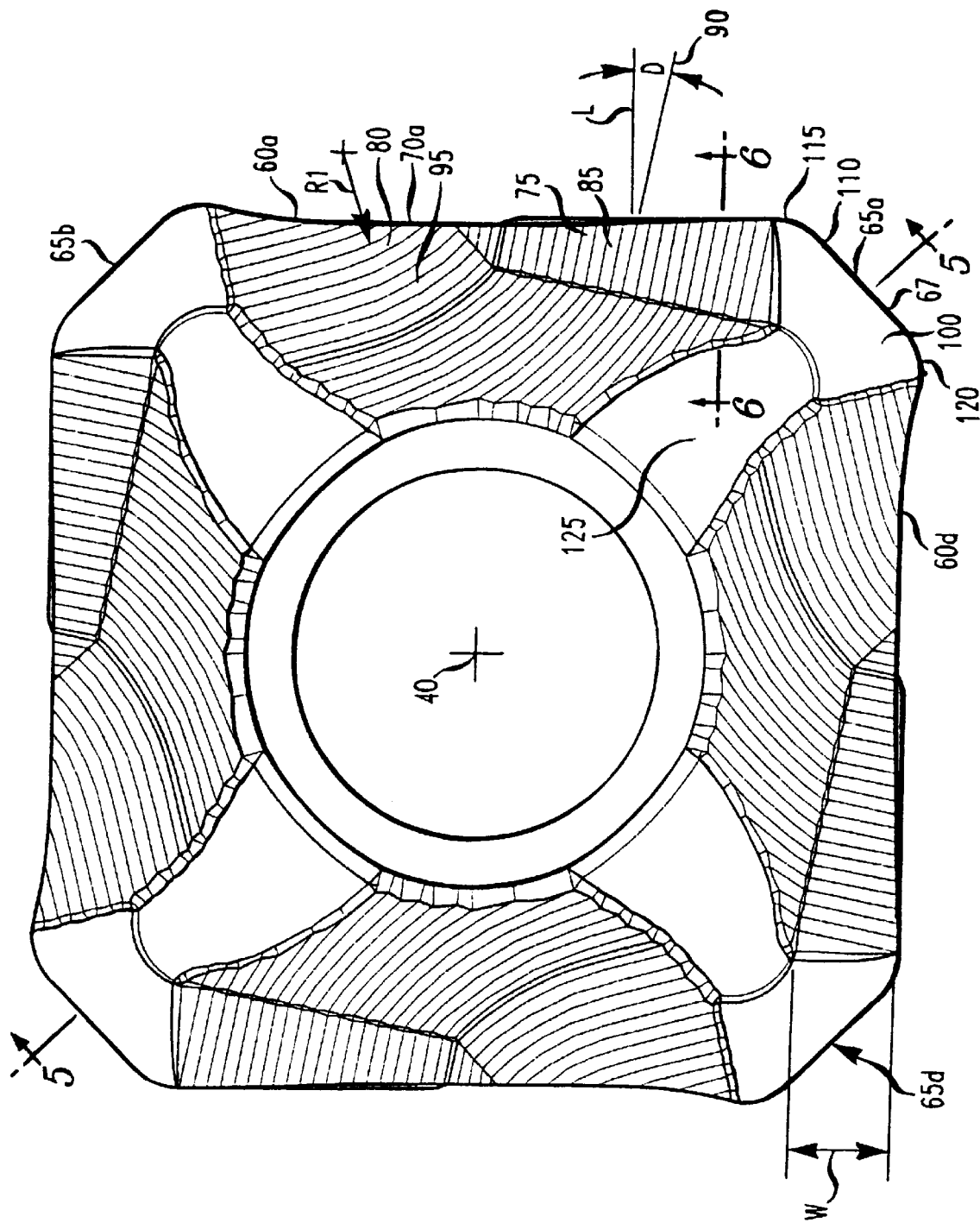
FIG. 3 is a top view of the cutting insert illustrated in FIG. 2.

The rake surface 75 may have a plurality of rake corrugations 85 extending inwardly toward the center from the side cutting edge 70a. The rake corrugations 85 may be along a corrugation line 90 which, as illustrated in FIG. 3, extends inwardly toward the center of the insert 10 and simultaneously extends in a direction from the first corner 65a to the second corner 65b thereby forming a rake corrugation angle D with a line L perpendicular to the side cutting edge 70a. The rake corrugation angle D may be between 1° and 60° and in FIG. 3 is approximately 15°.

The deflecting surface 80 may also have a plurality of deflecting corrugations 95 adjacent to the rake corrugations 85. The deflecting corrugations 95 extend inwardly toward the center of the insert 10 and simultaneously extend in a direction from a first corner 65a to the second corner 65b to form a flow pattern for chip ejection which approximates the natural flow of the chip.

As illustrated in FIG. 3, the deflecting corrugations 95 of the deflecting surface 80 may be in one-to-one alignment with the rake corrugations 85 of the rake surface 75. Such an arrangement promotes a continuous surface for directing the chip flow and promoting chip ejection. The rake corrugations 85, as illustrated by radius R1 in FIG. 3, may have a curvature to promote chip control. As an example, the radius R1 may have a value of between 0.08 and 0.50 inches and, as illustrated, is approximately 0.18 inches.

Returning to FIG. 1, a portion of a workpiece WP is illustrated with insert 10 positioned for material removal. The milling cutter body 15 is moved from left to right as indicated by arrow X thereby positioning the insert 10 against the workpiece WP. Under the assumption the milling cutter body is not moving vertically along the central axis 30, the feed rate at which the cutter body 15 is moved from left to right along arrow X determines the amount the side cutting edge 70a penetrates the workpiece WP. The penetration P of the insert 10 into the workpiece WP produced by the feed rate is indicated in FIG. 1. This determines the amount of the insert 10 that will contact the workpiece WP in a direction perpendicular to the side cutting edge 70a.

On the other hand, the positioning of the milling cutter body 15 along the longitudinal axis 30 relative to the workpiece WP defines the depth of the cut (doc) of the insert 10 within the workpiece WP which, in turn, determines the amount of the cutting edge 70a engaged by the workpiece WP. This is indicated by length EE illustrated in FIG. 1.

When only a short length of side cutting edge 70a is engaged, as indicated by length EE in FIG. 1, then side cutting edge 70a is engaged only in the region of the rake surface 75. As a result, material is removed form the workpiece W and it is directed toward the center of the insert 10 along rake corrugations 85. When the material contacts rake surface 75, the material may curl to produce an acceptable chip. However, if contact with the rake surface 75 is not sufficient to form an acceptable chip then the material will continue and will strike the deflecting surface 80. This contact will force the material to abruptly change direction upwardly along the deflecting surface 80. Additionally, the material will be directed by the deflecting corrugations 95 toward the second corner 65b of the insert 10 which, as previously mentioned, approximates the natural flow of a chip.

In most cases, when the insert 10 is utilized in a metal working operations, the penetration P may be high or the length EE of the engaged edge may be high but they will not be so simultaneously. Therefore, the rake surface 75 has its greatest width W (corners 65d, FIG. 3) proximate to the first corners 65a. The width W becomes smaller as the rake surface 75 approaches the second corner 65b.

Note for illustrative purposes, width W was shown on the rake surface associated with corner 65d. However, the width W actually applies to the related rake surface 75 associated with corners 65a.

As illustrated in FIG. 2, at a length RL along the side cutting edge 70a, the rake surface 75 ends and the deflecting surface 80 extends to the side cutting edge 70a. It is assumed that if and when the insert 10 is utilized to engage the entire length RL of the rake surface 75, then the penetration P will be relatively low. As a result, the initial contact of the workpiece will remain upon the rake surface 75 and will not contact the deflecting surface 80.

However, in certain circumstances, the length EE of the engaged edge may exceed the length of the rake surface 75 thereby engaging the deflecting surface 80 along the side cutting edge 70a. As will be discussed, the insert may also accommodate these conditions.

Figure 8:
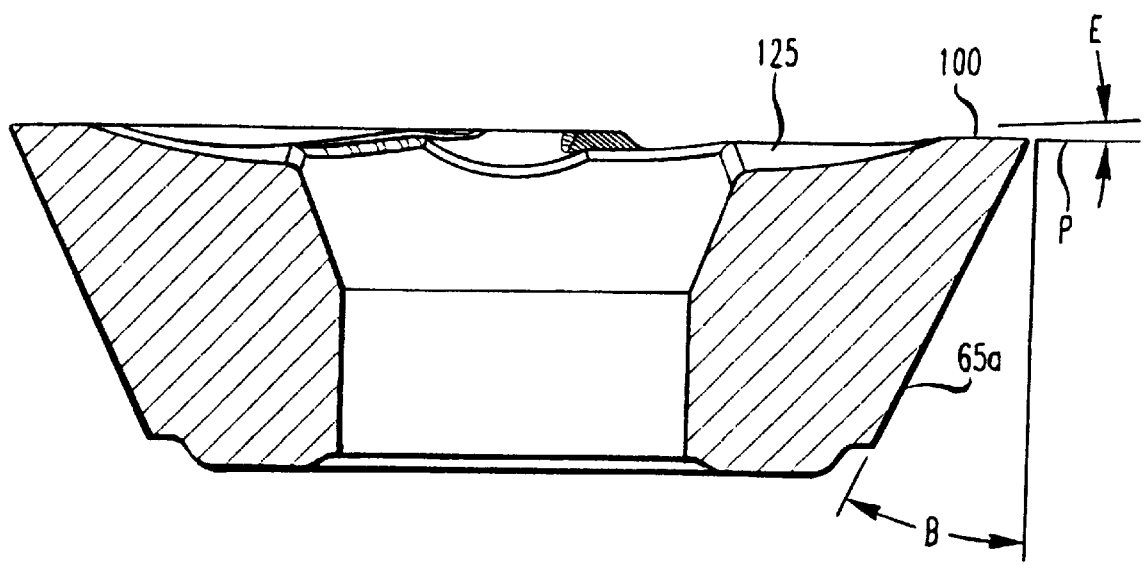
FIG. 8 is a cross sectional view of an alternate embodiment of the cutting insert illustrating a facet angle of 5°.

As illustrated in FIGS. 2 and 3, the side 60a of the insert 10 is connected to the adjacent side 60d by a corner 65a. The top surface 45 of the corner 65a is made up of a facet 100. The facet 100 is elevated with respect to the top surface 45 and maybe canted downwardly as it extends inwardly to provide a positive facet angle E as illustrated in FIG. 8, which is a cross section view of an alternate embodiment of an insert. The facet angle E is formed between a line extending along the plane P with a line extending along the facet 100. The facet angle E may be between 0° (FIG. 5) and 20°.

Returning to FIG. 3, the facet 100 is comprised of a middle section 110 having a straight profile and two end sections 115, 120 extending therefrom each having curved profiles which blend with the side cutting edges 70a, d of the insert 10. The curved profile of end section 115 functions as a wiper during the metal cutting operations illustrated in FIG. 1 to impact a surface finish to the workpiece WP. The contour of the facet 100 may extend downwardly from the cutting edge 67 toward the bottom of the insert 10.

Briefly returning to FIG. 1, as the insert 10 is moved in the direction of arrow X, the side cutting edge 70a engages the workpiece and thereafter the end section 115 of the corner cutting edge 67 engages the workpiece WP. For that reason, the contour of the end section 115 associated with the facet 100 is important and may have any number of profiles dependent upon the type of surface finish desired in the cutting operation. Although not illustrated but easily envisioned, the facet 100 may be comprised of an entirely curved section which blends with the cutting edge 70a, 70d along the sides 60a, 60d of the insert 10.

In addition to providing a surface finish to the workpiece WP, the contour of the facet 100 also may be used to impart strength to the insert 10 by providing a surface lacking sharp corners which would be vulnerable to breaking.

As shown in FIGS. 1–3, extending inwardly from the facet 100 is a depression 125 extending toward the center of the insert 10. As illustrated in FIG. 5, the depression 125 descends from the elevation of the facet 100 as it extends toward the center of the insert 10. In certain instances, the insert 10 may be utilized with coolant and the depression 125 may therefor provide a drainage path for such coolant.

FIG. 4 illustrates a side view of the insert 10 and shows the contour of the cutting edge 70 in the region of corner 65a, side 60a and corner 65b. Moving from left to right, the cutting edge 70a closest to the corner 65a is linear in the region of the rake surface 75. At the transition location T, also shown in FIG. 2, the side cutting edge 70a begins to curve upwardly until it intersects with corner 65b. The radius of curvature R2 of the side cutting edge 70a in the region where the deflecting surface 80 intersects with the side cutting edge 70a becomes progressively smaller along the length of the side cutting edge 70a to the corner 65b. This is done not only for practical considerations to connect the cutting edge 70a with the corner 65b but also permits the deflecting surface 80 to depart to the workpiece WP a steep angle to promote chip formation.

Therefore, the side cutting edge 70a from the first corner 65a to the second corner 65b descends to form a positive axial rake angle which, as illustrated in FIG. 4, is identified as angle F then the side cutting edge 70a ascends to the level of the second corner 65b. The axial rake angle F may have a value ranging from 0°–15° and preferably an angle of approximately 6°.

Figure 6:
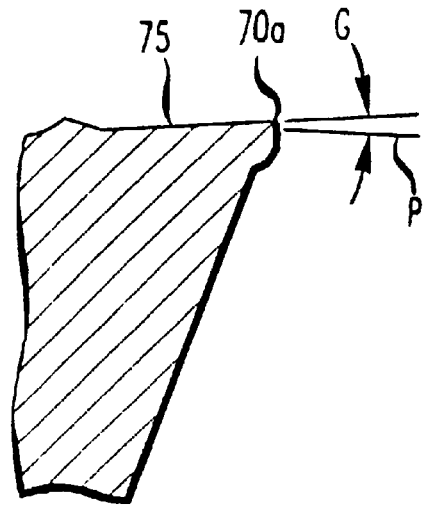
FIG. 6 is a cross section view of a portion of the cutting insert along lines "6—6" in FIG. 3.

FIG. 6 illustrates the cross-section of a part of the cutting insert 10 along arrows "6—6" in FIG. 3. The rake surface extends inwardly from the cutting edge 70a and forms a radial rake angle G with the plane P. The radial rake angle G may have a range between −10° and +20°.

The insert 10, as illustrated in FIG. 2, may have a central aperture 130 which may be used with a mounting screw to secure the insert to the cutter body 15. However, any number of clamping systems typically used to secure inserts within tool to holder bodies may be utilized and are known by those skilled in the art of metal cutting.

As illustrated in FIG. 4, the sides 60a, 60b taper downwardly and then are recessed inwardly before intersecting with the bottom surface 50. This feature simplifies the insert manufacturing process and also makes it possible to mount the insert into a stronger pocket having pocket walls which are connected by relatively large radii, instead of very small radii which would be necessary to accommodate an insert having tapered walls extending all of the way down to the bottom surface 50 of the insert.

What has been described is a cutting insert having a geometric configuration providing enhanced chip control. Modifications may be made within the scope of the appended claims.

What is claimed is:

1. An indexable cutting insert comprising a polygonal body of wear resistant material wherein the body has a center and includes top and bottom surfaces and therebetween a peripheral wall with sides and corners, wherein the intersection of the peripheral wall and the top surface forms a cutting edge extending from a first corner, along a side to a second corner, wherein for a cutting operation the insert is intended to engage a workpiece using the cutting edge, wherein the top surface comprises:

a) a rake surface extending inwardly from the cutting edge toward the center of the insert along a length of the cutting edge from the first corner to a transition location spaced from the second corner;

b) a deflecting surface extending upwardly and extending inwardly toward the center of the insert body along the length of the cutting edge;

c) wherein between the first corner and the transition location the deflecting surface is recessed from the cutting edge and adjacent to the rake surface; and d) wherein the deflecting surface between the transition location and the second corner is directly adjacent to the cutting edge.

2. The insert according to claim 1 wherein the rake surface has a plurality of rake corrugations extending inwardly from the cutting edge.

3. The insert according to claim 2 wherein the rake corrugations are along a corrugation line which as it extends inwardly toward the center of the insert simultaneously in a direction from the first corner to the second corner of the cutting edge and forms a rake corrugation angle D with a line perpendicular to the cutting edge.

4. The insert according to claim 3 wherein the rake corrugation angle D is between 1 and 60 degrees.

5. The insert according to claim 4 wherein the rake corrugation angle D is 15 degrees.

6. The insert according to claim 3 wherein the deflecting surface has a plurality of deflecting corrugations extending from the rake corrugations.

7. The insert according to claim 6 wherein the deflecting corrugations extend inwardly toward the center of the insert and simultaneously extend in a direction from the first corner to the second corner to form a flow pattern for chip ejection.

8. The insert according to claim 6 wherein the rake surface has a plurality of rake corrugations extending inwardly from the cutting edge and wherein the deflecting corrugations are aligned with the rake corrugations.

9. The insert according to claim 3 wherein the width of a rake face extending away from the cutting edge diminishes from the first corner to the transition point along the cutting edge.

10. The insert according to claim 1 wherein the rake surface further extends downwardly as it extends inwardly from the cutting edge toward the center of the insert body.

11. The insert according to claim 10 wherein the rake surface is planar and extends downwardly to form an angle G with a line parallel to a plane resting on the corners of the insert.

12. The insert according to claim 11 wherein the angle G is between −10 and +20.

13. The insert according to claim 1 wherein the side of the insert is connected to an adjacent side by a corner and the top surface of the corner is made up of a facet extending therebetween.

14. The insert according to claim 13 wherein the facet is elevated with respect to the remaining top surface and canted downwardly as it extends inwardly to provide a positive rake angle.

15. The insert according to claim 13 wherein the facet is comprised of a middle section having a straight profile and end sections extending therefrom having curved profiles which blend with the cutting edge along the side of the insert.

16. The insert according to claim 13 wherein the facet is comprised of a curved section which blends with the cutting edge along the side of the insert.

17. The insert according to claim 13 further including a depression extending inwardly from the facet.

18. The insert according to claim 1 wherein from the cutting edge from the first corner to the second corner descends to provide a positive axial rake angle and then ascends to the level of the second corner.

19. The insert according to claim 1 wherein the cutting edge when viewed from the side has curved portion with a radius of curvature and the radius of curvature decreases in a direction from the first corner to the second corner.

20. The insert according to claim 1 wherein a central aperture extends through the insert body for accepting a mounting screw to secure the insert within a toolholder.

21. An assembly of a toolholder and an indexable cutting insert wherein the cutting insert is mounted within a seat in the toolholder and wherein the cutting insert comprises a polygonal body of wear resistant material wherein the body has a center and includes top and bottom surfaces and therebetween a peripheral wall with sides and corners, wherein the intersection of the peripheral wall and the top surface forms a cutting edge extending from a first corner, along a side to a second corner, wherein for a cutting operation the insert is intended to engage a workpiece using the cutting edge, wherein the top surface comprises:

a) a rake surface extending inwardly from the cutting edge toward the center of the insert body along a length of the cutting edge from the first corner to a transition location spaced from the second corner;

b) a deflecting surface extending upwardly and extending inwardly toward the center of the insert body along the length of the cutting edge;

c) wherein between the first corner and the transition location the deflecting surface is recessed from the cutting edge and adjacent to the rake surface; and d) wherein the deflecting surface is directly adjacent to the cutting edge between the transition location and the second corner.

* * * * *